３,190,931
METHOD FOR OXYCHLORINATION OF HYDROCARBONS
Francois Lainé, Eaubonne, Claude Kaziz, La Courneuve, and Georges Wetroff, Le Thillay, France, assignors to Pechiney-Compagnie de Produits Chimiques et Electrometallurgiques, Paris, France
No Drawing. Filed July 13, 1962, Ser. No. 209,796
Claims priority, application France, July 26, 1961, 869,052/61
6 Claims. (Cl. 260—659)

This invention relates to the oxychlorination reaction to introduce chlorine onto hydrocarbons as by the reaction at elevated temperature of the hydrocarbon with a mixture of oxygen and hydrogen chloride, with or without dilution with an inert gas, and in the presence of a catalyst, such as a Deacon type catalyst.

Various processes have heretofore been employed for oxychlorination of hydrocarbons in the presence of a catalyst. One such process which makes use of a fluid catalytic bed to promote heat exchange and to avoid the rise in temperature to an undersirable range is otherwise subject to a number of deficiencies. The fluid bed process is not conducive to high conversion rates and separations are required to remove the chlorinated product from unreacted gases which may be recycled and for separation of catalyst particles which might become entrained in the effluent from the reactor. The gas separation, as above described, is made even more difficult by reason of the necessity to dilute the reactants in the attempt to avoid explosive mixtures.

The conversion rate can be maximized by the use of a multi-stage system but this adds to the amount of apparatus required and it operates further to complicate the already delicate process. Further, the multi-stage system requires separation of the gases issuing from the reactor and thus requires the addition of cyclones, filters, and the like.

Another such process makes use of a fixed catalytic bed but which has been found to be poor in heat exchange. Thus the distribution of heat generated by the reaction is slow to the extent that hot spots appear in the processes which make use of fixed beds and such hot spots in the catalytic bed often lead to undesirable secondary reactions thereby to reduce the yield of desirable product and complicate purification thereof. In the attempt to minimize hot spots, various techniques have been adopted, such as dilution of the reactants to limit the conversion rate to a reduced value such that only partial reaction can be achieved with corresponding lesser increases in temperature. This technique necessitates the separation of the chlorinated product from the unreacted gases in the effluent for recycling. Thus the process which makes use of the fixed catalyst bed is characterized by a relatively low rate of production and low yield.

It is an object of this invention to produce a new and improved process and apparatus for the oxychlorination of saturated or olefinic hydrocarbons at elevated temperatures in the presence of a catalyst. It is a related object to provide a method and apparatus of the type described which provides for safe and efficient conversion, which provides for high yield and which provides for a high rate of conversion without the development of an explosive mixture, without the development of secondary reactions, and without the development of hot spots or excessive non-uniformities in temperature distribution through the reaction zone and with efficient utilization of catalyst.

These objectives have been achieved, in accordance with the practice of this invention, by subdividing the chlorination process into a first phase which makes use of a fluid bed in which the conversion reaction is only partially completed and wherein the conversion is carried towards completion in the second phase which makes use of a fixed or stationary catalytic bed without the need for treatment of the effluent from the first phase for the separation of entrained solids and wherein the chlorinated product formed during the first phase functions as a diluent for the feed into the second phase to permit additional ingredients to be added to the second phase and to provide for a high rate of conversion without the development of hot spots, etc.

The described combination of a fluid catalytic bed and a fixed catalytic bed employed in the first and second phases of the reaction respectively operate to avoid many, if not all, of the difficulties characteristic of each of the two reactor systems when employed separately.

In the first phase which makes use of the fluid catalytic bed, the reactor can be fed with a high concentration of the ingredients and at a high rate of flow because the catalyst carriers are maintained in continuous motion to enable uniform distribution of heat and to enable rapid removal of heat generated by the reaction. It is preferred to operate the system at a flow rate considerably higher than the minimal speed of fluidization, such as 6 to 15 times the speeds. Under these conditions, a conversion rate of 40 to 80 percent is achieved during the first phase of the reaction.

In the combination described, it is not necessary to provide for separation of solids entrained in the effluent from the first phase since such entrained solids will be removed from the gaseous stream, as by filtration, by the fixed catalytic bed during flow of the effluent therethrough during the second phase of the reaction.

The combination described provides for additional improvements over processes which have heretofore been employed. For example, the amount of hydrocarbon embodied in the feed to the first phase can be maintained below that theoretically required for the reaction and in a concentration which is clearly outside the explosive limit. The deficiency of the hydrocarbon in the feed advanced to the first phase can be made up by addition to the feed stream to the second phase where the hydrocarbon chlorinated in the first phase operates to dilute the mixture whereby it becomes safe to make up the hydrocarbon deficiency by additions to the effluent and before carrying out the second phase thereby to avoid dangers previously encountered. Under these conditions, the theoretical amounts of hydrocarbon and hydrogen chloride are introduced into the combined system for reaction.

By the combination of the system described for the separate phases used in combination, it becomes possible to maintain a rather uniform and constant temperature within the catalytic beds or reaction zones and to make use of heat exchangers in direct communication with the exterior walls of the reactor sections for the purpose of conducting away heat of reaction. For the fixed bed, it is desirbale to make use of tubular reactors of relatively small cross-section thereby to favor heat exchange. In accordance with a preferred embodiment, the second phase is carried out at a temperature slightly higher, about 5° to 50° C. higher, than the temperature of reaction employed in the first phase, the optimum temperature depending somewhat upon the type of hydrocarbon that is to be chlorinated. For example, in the chlorination of an olefinic hydrocarbon by the addition of chlorine to satisfy unsaturated groups, a reaction temperature in the range of 250–350° C. should be used. On the other hand, a reaction temperature of 450–550° C. should be employed where the chlorine is to be substituted onto the hydrocarbon.

Since only a partial reaction is carried out in each phase, the conditions to which the catalytic agent is exposed will remain rather mild. Thus the active life of the catalyst will be greatly extended by comparison with the life of the catalyst in a single phase system.

The catalyst in the first phase, operated on the principles of a fluid catalytic bed, makes use of a porous carrier having a large specific surface and good mechanical strength, as represented by porous aluminum oxide. The carrier is impregnated with a Deacon type catalyst, such as cupric chloride, in an amount to provide 0.1 to 20 percent by weight of catalyst, with or without adjuvants such as alkali metal chlorides, including sodium chloride, potassium chloride and lithium chloride, or alkaline earth metal chlorides, such as zinc chloride, barium chloride and the like. The catalyst in the second phase, operating on the fixed catalytic bed principle, can make use of a carrier of the same type used in the first phase but it is preferred to dilute the catalyst impregnated carrier by uniform admixture with a porous granular component characterized by good heat conductivity, such as porous graphite, porous coke, and the like, which may or may not be impregnated with the catalyst.

The following example is given by way of illustration, but not by way of limitation, of the practice of this invention:

*Example 1*

For the chlorination of ethylene to form dichloroethane, the first reactor forming the first phase of the reaction is in the form of a tube having an internal diameter of 40 mm. and a height of 0.5 m. It is jacketed with a heat exchanger through which a coolant liquid may be circulated and it is provided at its lower end portion with a grate for more uniform distribution of the feed gases through the cross-section. The reactor is loaded through a length of about 8.5 cm. with 116 grams of a catalyst component composed of activated aluminum oxide in particle form (mean diameter 60 microns and a specific surface of 300 m.$^2$/g.). The catalyst is impregnated with 1 percent by weight solids of cupric chloride and 1 percent by weight solids of potassium chloride.

The second reactor is formed of a tubular member jacketed for circulation of a coolant fluid in heat exchange with its outer walls. It is dimensioned to have a diameter of 50 mm. and a height of 60 cm. The reactor is filled with a granular mixture of 10 percent by volume activated aluminum oxide having a mean cross-section of 2 mm., impregnated with 10 percent by weight of copper chloride and 90 percent by volume porous graphite which operates to permit uniform distribution of heat.

The first reactor in the first phase of the reaction is fed at a flow rate of 105 l./hour with a gaseous mixture preheated to 100° C. and composed of 15 l. of ethylene, 40 l. of gaseous hydrogen chloride and 50 l. of air. The reactor is maintained at a temperature of 320° C. in the reaction zone. The conversion of ethylene is about 71 percent. To the effluent formed of dichloroethane, water vapor and gases which have not been reacted, there is introduced additional ethylene in amounts to provide a flow rate of 5 l. of ethylene per hour for completing the conversion of hydrogen chloride.

The mixture is passed through the second reactor maintained at a reaction temperature of about 350° C. The effluent issuing from the second reactor is cooled to condense the water vapor and the chlorinated derivatives. A final separation is effected by absorption on a column of active coal. The total conversion rate of the consumed ethylene is 97.5 percent. The cold condensed organic liquid phase has the following composition (by weight):

| | Percent |
|---|---|
| 1-2 dichlorethane | 98.5 |
| Vinyl chloride | 0.2 |
| Ethyl chloride | 0.1 |
| 1-1-1 trichlorethane | 0.1 |
| 1-1-2 trichlorethane | 0.6 |
| Cis and trans dichlorethylene | 0.1 |
| Tetrachlorethane | 0.3 |

It will be apparent from the foregoing that there is provided a new and improved oxychlorination process in which temperature conditions are controlled to a desirable and uniform level and wherein a high conversion rate and high yield can be achieved without exposure of the process to dangerous conditions and with improvement in the operating life of the catalyst.

It will be understood that changes may be made in the various pieces of equipment and in the methods of handling the materials and in the amounts thereof without departing from the spirit of the invention, especially as defined in the following claims.

We claim:

1. In the process for the oxychlorination of hydrocarbons selected from the group consisting of olefinic hydrocarbons and saturated hydrocarbons by reaction of the hydrocarbon, oxygen and hydrogen chloride at elevated temperature within the range of 250–550° C. and in the presence of a Deacon type catalyst, the steps of passing the hydrogen chloride, oxygen and hydrocarbon in admixture through a fluid bed of catalyst to achieve 40–80 percent conversion in a first phase and then directly passing the effluent from the first phase through a stationary catalytic bed at a reaction temperature higher than the reaction temperature in the first phase and wherein the conversion reaction is continued towards completion to produce the desired oxychlorinated hydrocarbon as a product.

2. The process as claimed in claim 1 in which the reaction temperature for the partial conversion in the fluid bed of the first phase is at a temperature within the range of 250–350° C. for the conversion of olefinic hydrocarbons.

3. The process as claimed in claim 1 in which the reaction temperature for the partial conversion in the fluid bed of the first phase is at a temperature within the range of 450–550° C. for conversion of saturated hydrocarbons.

4. The process as claimed in claim 1 in which the temperature during reaction in the stationary bed is 5–50° C. higher than the temperature of reaction in the fluid bed.

5. In a process for the oxychlorination of hydrocarbons selected from the group consisting of olefinic hydrocarbons and saturated hydrocarbons by reaction of the hydrocarbon, oxygen and hydrogen chloride at elevated temperature within the range of 250–550° C. and in the presence of a Deacon type catalyst, the steps of passing the hydrogen chloride, oxygen and hydrocarbon in admixture through a fluid bed of catalyst in which the amount of hydrocarbon is less than the amount theoretically required for the reaction to achieve 40–80 percent conversion in a first phase, introducing hydrocarbon to the effluent issuing from the first phase in an amount at least sufficient to make up the deficiency, and then directly passing the effluent from the first phase with the additional amount of hydrocarbon through a stationary catalytic bed for reaction at a temperature higher than the reaction temperature in the first phase wherein the conversion reaction is continued towards completion to produce the desired oxychlorinated hydrocarbon as a product.

6. The process as claimed in claim 5 in which the temperature of reaction in the stationary bed is 5–50° C. higher than the temperature of reaction in the fluid bed.

References Cited by the Examiner

UNITED STATES PATENTS

| 2,399,488 | 4/46 | Hearne | 260—659 |
|---|---|---|---|
| 2,585,469 | 2/52 | Johnson | 260—662 XR |
| 2,746,844 | 5/56 | Johnson et al. | 260—656 |
| 2,919,296 | 12/59 | Thermet et al. | 260—662 XR |

LEON ZITVER, *Primary Examiner.*